US011308395B2

(12) United States Patent
Han

(10) Patent No.: US 11,308,395 B2
(45) Date of Patent: Apr. 19, 2022

(54) METHOD AND SYSTEM FOR PERFORMING MACHINE LEARNING

(71) Applicant: ALIBABA GROUP HOLDING LIMITED, Grand Cayman (KY)

(72) Inventor: Liang Han, Campbell, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 391 days.

(21) Appl. No.: 16/396,563

(22) Filed: Apr. 26, 2019

(65) Prior Publication Data

US 2019/0332940 A1 Oct. 31, 2019

Related U.S. Application Data

(60) Provisional application No. 62/663,955, filed on Apr. 27, 2018.

(51) Int. Cl.
*G06N 3/08* (2006.01)
*G06N 20/00* (2019.01)
*G06N 3/04* (2006.01)

(52) U.S. Cl.
CPC .......... *G06N 3/082* (2013.01); *G06N 3/0481* (2013.01); *G06N 20/00* (2019.01)

(58) Field of Classification Search
CPC ....... G06N 3/082; G06N 20/00; G06N 3/0481
USPC .......................................................... 706/15
See application file for complete search history.

(56) References Cited

U.S. PATENT DOCUMENTS

| 5,091,864 A | 2/1992 | Baji et al. |
| 6,760,776 B1 | 7/2004 | Gallo et al. |
| 8,402,543 B1 | 3/2013 | Ranjan et al. |
| 2017/0278513 A1 | 9/2017 | Li et al. |
| 2018/0092545 A1* | 4/2018 | Kim ..................... A61B 5/01 |
| 2018/0096249 A1* | 4/2018 | Kim ..................... G06N 3/0454 |
| 2018/0101749 A1 | 4/2018 | Yang et al. |

OTHER PUBLICATIONS

Lee, et. al., "Structure Level Adaptation for Artificial Neural Networks", Springer Science + Business Media, LLC, 1991 (Year: 1991).*
Tan, et al., "Reducing Data Dimensionality through Optimizing Neural Network Inputs", AlCheE Journal, Jun. 1995, vol. 41, No. 6 (Year: 1995).*

(Continued)

*Primary Examiner* — Tsu-Chang Lee
(74) *Attorney, Agent, or Firm* — Finnegan, Henderson, Farabow, Garrett & Dunner, LLP

(57) ABSTRACT

Embodiments of the disclosure provide methods and systems for performing machine learning. The method can include: receiving training data; training a machine learning model based on the training data, wherein the machine learning model includes multiple layers each having one or more nodes having one or more connections with a node from another layer of the machine learning model; evaluating weights associated with the connections of the machine learning model, wherein each connection has a corresponding weight; removing, from the machine learning model, one or more connections having a weight that does not satisfy a threshold condition; and after the connections have been removed, updating the machine learning model.

12 Claims, 9 Drawing Sheets

(56) References Cited

OTHER PUBLICATIONS

PCT Notification of Transmittal of the International Search Report and the Written Opinion of the International Searching Authority issued in corresponding International Application No. PCT/US19/29440, dated Jul. 2, 2019, 7 pages.

Song Han et al."Deep Compression: Compressing Deep Neural Networks With Pruning, Trained Quantization and Huffman Coding", Published as a conference paper at ICLR 2016, arXiv:1510.00149v5 [ cs.CV] Feb. 15, 2016 (p. 1-14).

Xin Wang et al. "SkipNet: Learning Dynamic Routing in Convolutional Networks" University of California, Berkeley Nanjing University, arXiv:1711.09485v2 [cs.CV] Jul. 25, 2018, (p. 1-19).

The extended European Search Report, supplementary European Search Report, and European Search Opinion, issued by the European Patent Office, corresponding with the European Application No. 19791717.2, dated Dec. 1, 2021. (11 pages).

Braun, et al., "ENZO-M—a hybrid approach for optimizing neural networks by evolution and learning", Parallel Problem Solving From Nature Ppsn III, Springer Berlin Heidelberg, Berlin, Oct. 9, 1994, pp. 439-451.

Hu Ya-Jun et al., "Deep belief network-based post-filtering for statistical parametric speech synthesis", 2016 IEEE International Conference On Acoustics, Speech and Signal Processing (ICASSP). IEEE, Mar. 20, 2016, pp. 5510-5514.

\* cited by examiner

METHOD AND SYSTEM FOR PERFORMING MACHINE LEARNING

CROSS REFERENCE TO RELATED APPLICATION

The disclosure claims the benefits of priority to U.S. Provisional Application No. 62/663,955, filed Apr. 27, 2018, which is incorporated herein by reference in its entirety.

BACKGROUND

With the development of machine learning programs, the dimensions of machine learning models have been increased significantly to improve model accuracy. A deep machine learning model, however, consumes substantial storage, memory bandwidth, energy consumption, and computational resources during model training or inference. These problems make it difficult to deploy deep machine learning models on mobile and embedded devices.

Embodiments of the disclosure address the above problems by providing methods and systems for performing machine learning.

SUMMARY

Embodiments of the disclosure provide a computer-implement method. The method can include: receiving training data; training a machine learning model based on the training data, wherein the machine learning model includes multiple layers each having one or more nodes having one or more connections with a node from another layer of the machine learning model; evaluating weights associated with the connections of the machine learning model, wherein each connection has a corresponding weight; removing, from the machine learning model, one or more connections having a weight that does not satisfy a threshold condition; and after the connections have been removed, updating the machine learning model.

Embodiments of the disclosure also provide a computer-implemented method for performing machine learning. The method can include: receiving input data to be provided to a machine learning model that includes multiple layers each having one or more nodes having one or more connections with a node from another layer of the machine learning model; processing, by a filter, the input data; and providing the processed input data to the machine learning model.

Embodiments of the disclosure further provide a non-transitory computer readable medium that stores a set of instructions that is executable by at least one processor of a computer system to cause the computer system to perform a method for simplifying a machine learning model. The method can include: receiving training data; training a machine learning model based on the training data, wherein the machine learning model includes multiple layers each having one or more nodes having one or more connections with a node from another layer of the machine learning model; evaluating weights associated with the connections of the machine learning model, wherein each connection has a corresponding weight; removing, from the machine learning model, one or more connections having a weight that does not satisfy a threshold condition; and after the connections have been removed, updating the machine learning model.

Embodiments of the disclosure further provide a non-transitory computer readable medium that stores a set of instructions that is executable by at least one processor of a computer system to cause the computer system to perform a method for performing machine learning. The method can include: receiving input data to be provided to a machine learning model that includes multiple layers each having one or more nodes having one or more connections with a node from another layer of the machine learning model; processing, by a filter, the input data; and providing the processed input data to the machine learning model.

Embodiments of the disclosure further provide a computer system. The computer system can include a memory storing a set of instructions; and at least one processor configured to execute the set of instructions to cause the system to perform: receiving training data; training a machine learning model based on the training data, wherein the machine learning model includes multiple layers each having one or more nodes having one or more connections with a node from another layer of the machine learning model; evaluating weights associated with the connections of the machine learning model, wherein each connection has a corresponding weight; removing, from the machine learning model, one or more connections having a weight that does not satisfy a threshold condition; and after the connections have been removed, updating the machine learning model.

Embodiments of the disclosure further provide a computer system for performing machine learning. They computer system can include: a memory storing a set of instructions; and at least one processor configured to execute the set of instructions to cause the system to perform: receiving input data to be provided to a machine learning model that includes multiple layers each having one or more nodes having one or more connections with a node from another layer of the machine learning model; processing, by a filter, the input data; and providing the processed input data to the machine learning model.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Particular aspects of the present disclosure are described in greater detail below. The terms and definitions provided herein control, if in conflict with terms or definitions incorporated by reference.

The techniques described in this disclosure have one or more of the following technical effects. In some implementations, the techniques described in this disclosure provide a computer-implemented method, including receiving training data; training a machine learning model based on the training data, wherein the machine learning model includes multiple layers each having one or more nodes having one or more connections with a node from another layer of the machine learning model; evaluating weights associated with the connections of the machine learning model, wherein each connection has a corresponding weight; removing, from the machine learning model, one or more connections having a weight that does not satisfy a threshold condition; and after the connections have been removed, updating the machine learning model. In some implementations, the techniques described in this disclosure simplify the machine learning model by removing one or more connections of the machine learning model. This also allows to reduce the storage space, the computation resources, and the power consumption required by the machine learning model. In some implementations, the techniques described in this disclosure also generate a filter for evaluating input data to be provided to the machine learning model. The filter can process the input data for the machine learning model at run time. The filter can reduce the input data by removing a portion of the input data. This allows to reduce the storage space, the bandwidth, the computation resources, and the power consumption required by the machine learning model. In some implementations, the filter can also incorporate guiding information into the input data, so that the input data can bypass at least one connection of the machine learning model based on the guiding information, without deteriorating the inference result. This allows to reduce the computation resources and power consumption required by the machine learning model.

As used herein, the terms "comprises," "comprising," or any other variation thereof are intended to cover a non-exclusive inclusion, such that a process, method, composition, article, or apparatus that comprises a list of elements does not include only those elements but may include other elements not expressly listed or inherent to such process, method, composition, article, or apparatus. The term "exemplary" is used in the sense of "example" rather than "ideal."

Figure 1:
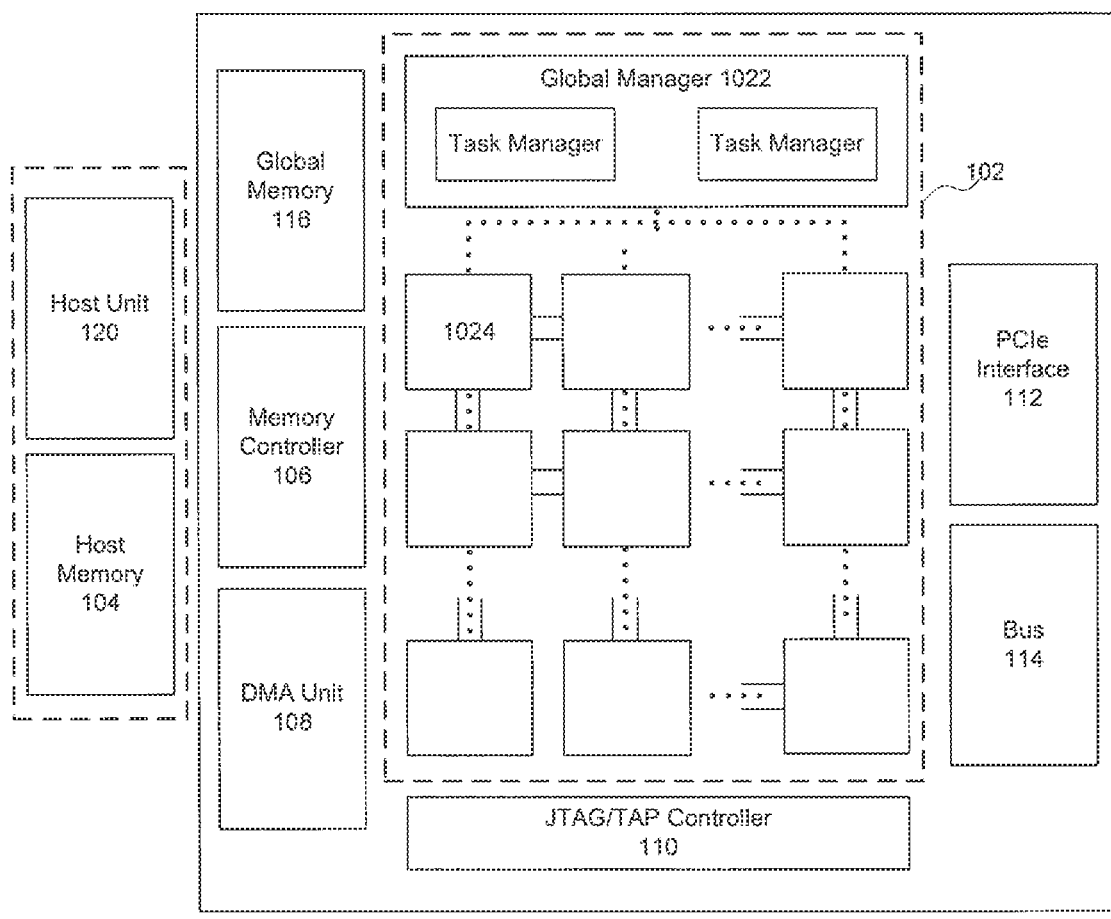
FIG. 1 illustrates a neural network processing architecture, according to embodiments of the disclosure.

FIG. 1 illustrates an exemplary neural network processing architecture 100, according to embodiments of the disclosure. As shown in FIG. 1, architecture 100 can include a chip communication system 102, an host memory 104, a memory controller 106, a direct memory access (DMA) unit 108, a Joint Test Action Group (JTAG)/Test Access End (TAP) controller 110, a peripheral interface 112, a bus 114, a global memory 116, and the like. It is appreciated that, chip communication system 102 can perform algorithmic operations (e.g., machine learning operations) based on communicated data.

Chip communication system 102 can include a global manager 1022 and a plurality of cores 1024. Global manager 1022 can include at least one task manager to coordinate with one or more cores 1024. Each task manager can be associated with an array of cores 1024 that provide synapse/neuron circuitry for the neural network. For example, the top layer of processing elements of FIG. 1 may provide circuitry representing an input layer to a neural network, while the second layer of cores may provide circuitry representing a hidden layer of the neural network. Therefore, chip communication system 102 can also be referred to as a neural network processing unit (NPU). As shown in FIG. 1, global manager 1022 can include two task managers to coordinate with two arrays of cores.

Cores 1024 can include one or more processing elements that each include single instruction, multiple data (SIMD) architecture including one or more processing units configured to perform one or more operations (e.g., multiplication, addition, multiply-accumulate, etc.) based on instructions received from global manager 1022. To perform the operation on the communicated data packets, cores 1024 can include one or more processing elements for processing information in the data packets. Each processing element may comprise any number of processing units. In some embodiments, core 1024 can be considered a tile or the like.

Host memory 104 can be off-chip memory such as a host CPU's memory. For example, host memory 104 can be a DDR memory (e.g., DDR SDRAM) or the like. Host memory 104 can be configured to store a large amount of data with slower access speed, compared to the on-chip memory integrated within one or more processors, acting as a higher-level cache.

Memory controller 106 can manage the reading and writing of data to and from a specific memory block within global memory 116 having on-chip memory blocks (e.g., 4 blocks of 8 GB second generation of high bandwidth memory (HBM2)) to serve as main memory. For example, memory controller 106 can manage read/write data coming from outside chip communication system 102 (e.g., from DMA unit 108 or a DMA unit corresponding with another NPU) or from inside chip communication system 102 (e.g., from a local memory in core 1024 via a 2D mesh controlled by a task manager of global manager 1022). Moreover, while one memory controller is shown in FIG. 1, it is appreciated that more than one memory controller can be provided in architecture 100. For example, there can be one memory controller for each memory block (e.g., HBM2) within global memory 116.

Memory controller 106 can generate memory addresses and initiate memory read or write cycles. Memory controller 106 can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers.

DMA unit 108 can assist with transferring data between host memory 104 and global memory 116. In addition, DMA unit 108 can assist with transferring data between multiple NPUs (e.g., NPU 100). DMA unit 108 can allow off-chip devices to access both on-chip and off-chip memory without causing a CPU interrupt. Thus, DMA unit 108 can also generate memory addresses and initiate memory read or write cycles. DMA unit 108 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, or the number of bytes to transfer in one burst. It is appreciated that architecture 100 can include a second DMA unit, which can be used to transfer data between other neural network processing architectures to allow multiple neural network processing architectures to communicate directly without involving the host CPU.

JTAG/TAP controller 110 can specify a dedicated debug port implementing a serial communications interface (e.g., a JTAG interface) for low-overhead access to the NPU without requiring direct external access to the system address and data buses. JTAG/TAP controller 110 can also have on-chip test access interface (e.g., a TAP interface) that implements a protocol to access a set of test registers that present chip logic levels and device capabilities of various parts.

Peripheral interface 112 (such as a PCIe interface), if present, serves as an (and typically the) inter-chip bus, providing communication between architecture 100 and other devices.

Bus 114 includes both intra-chip bus and inter-chip buses. The intra-chip bus connects all internal components to one another as called for by the system architecture. While not all components are connected to every other component, all components do have some connection to other components they need to communicate with. The inter-chip bus connects the NPU with other devices, such as the off-chip memory or peripherals. Typically, if there is a peripheral interface 112 (e.g., the inter-chip bus), bus 114 is solely concerned with intra-chip buses, though in some implementations it could still be concerned with specialized inter-bus communications.

Chip communication system 102 can be configured to perform operations based on neural networks.

Architecture 100 can also include a host unit 120. Host unit 120 can be one or more processing unit (e.g., an X86 central processing unit). In some embodiments, a host system having host unit 120 and host memory 104 can comprise a compiler (not shown). The compiler is a program or computer software that transforms computer codes written in one programming language into NPU instructions to create an executable program. In machining applications, a compiler can perform a variety of operations, for example, pre-processing, lexical analysis, parsing, semantic analysis, conversion of input programs to an intermediate representation, code optimization, and code generation, or combinations thereof. In addition to compiling a program, the host system can also analyze input data to be processed by chip communication system 102, so that features of the input data can be extracted.

In some embodiments, the compiler that generates the NPU instructions can be on the host system, which pushes commands to chip communication system 102. Based on these commands, each task manager can assign any number of tasks to one or more cores (e.g., core 1024). Some of the commands can instruct DMA unit 108 to load the instructions (generated by the compiler) and data (e.g., input data) from host memory 104 into global memory 116. The loaded instructions can then be distributed to each core assigned with the corresponding task, and the one or more cores can process these instructions.

FIGS. 2A-F illustrate schematic diagrams of machine learning models, according to embodiments of the disclosure. As an example of the machine learning model, a neural network can include a plurality of layers, and each layer can include a plurality of nodes (also known as artificial neurons). Connections among the plurality of nodes can be established by training the neural network with training data.

Figure 2A:
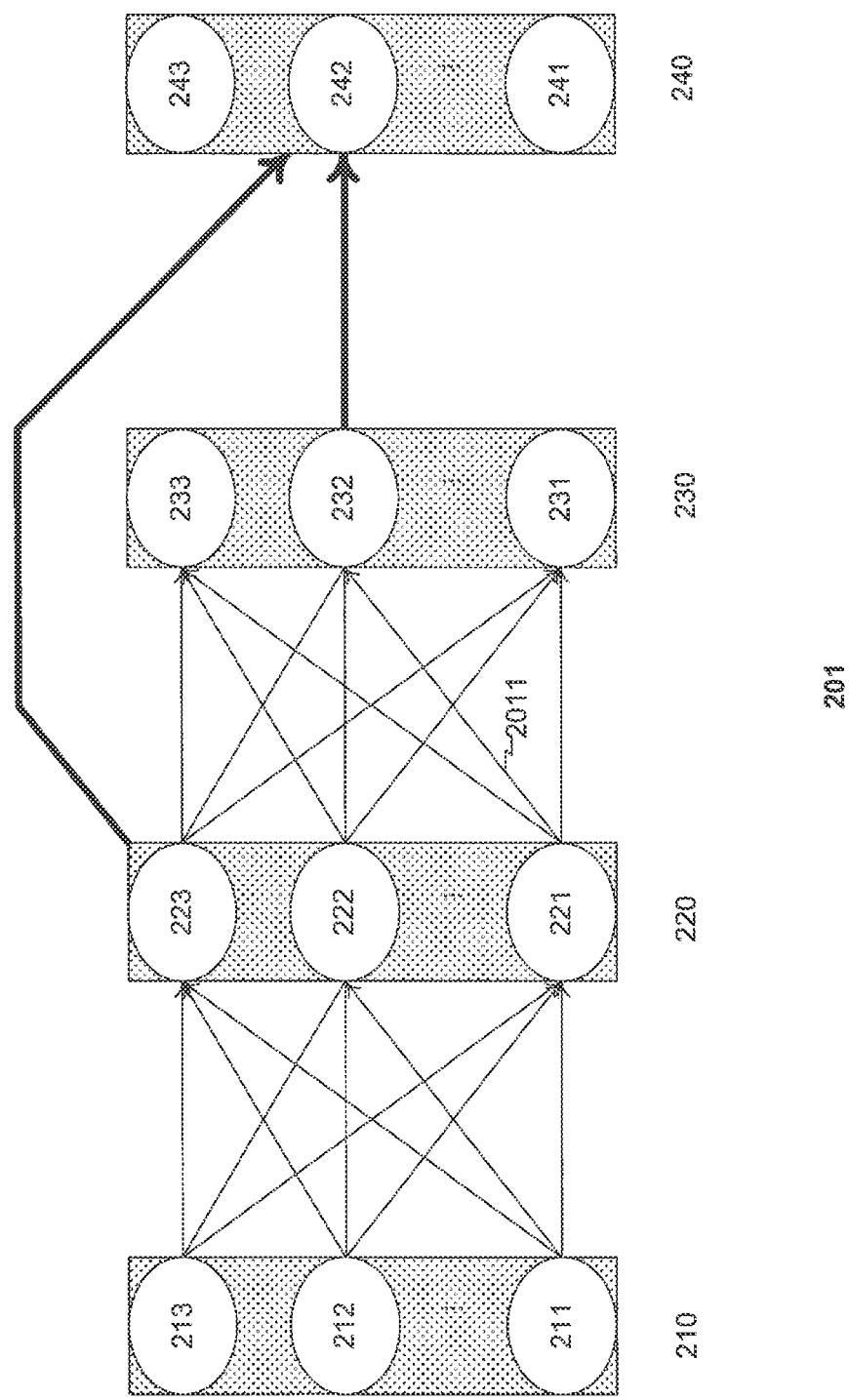
FIGS. 2A-F illustrate schematic diagrams of machine learning models, according to embodiments of the disclosure.

In FIGS. 2A-2F, the bolded arrows can represent many connections between the layers. The training of the neural network can also be referred to as machine learning, and the trained neural network can also be referred to as a machine learning model. Each of the connections can be assigned with a weight including a number of bits (e.g., 32 bits). The weight of a connection can increase or decrease the strength of the signal at the connection. For example, as shown in FIG. 2A, a weight of a connection 2011 between two nodes 221 and 231 can be zero. Therefore, the signal passing through connection 2011 is decreased to zero. In other words, the signal cannot pass through connection 2011, and the two nodes 221 and 231 are disconnected.

FIG. 2A illustrates a schematic diagram of an exemplary neural network 201. Neural network 201 can include four layers (e.g., layers 210, 220, 230, and 240), each including a plurality of nodes (e.g., nodes 211, 212, 213, and the like). In some embodiments of the disclosure, neural network 201 can be an initial neural network used for training. The initial neural network is a neural network with default parameters (e.g., a weight of a connection). The parameters of a neural network can be related to connections among the nodes and weights of the connections. In some embodiments, neural network 201 can be a trained neural network developed by training the initial neural network based on training data, so that a plurality of connections among the plurality of nodes of the layers can be established.

According to embodiments of the disclosure, the plurality of connections in neural network 201 can be simplified. In some embodiments, the simplification can be performed on neural network 201 during training. Simplification during training can also be referred to as simplification at static time.

In some embodiments, the simplification can remove a connection between two nodes during training. FIG. 2B illustrates a schematic diagram of a neural network 202 after pruning, which involves the removal of some connections (also known as synapses), according to embodiments of the disclosure. For example, in FIG. 2B, connection 2011 of FIG. 2A has been removed from neural network 201. As discussed above, each connection of the trained neural network is assigned with a connection weight. Then, it can be determined whether the connection weight satisfies a threshold. For example, when the connection weight is greater or equal to the threshold, the connection weight satisfies the threshold and the corresponding connection is maintained. Otherwise, when the connection weight is less than the threshold, the connection weight does not satisfy the threshold. If the connection weight of the connection does not satisfy the threshold, the corresponding connection can be removed. In some embodiments, a connection can be removed by setting the connection weight of the connection to zero. In some embodiments, the connection can also be removed by deleting the connection from the neural network.

In some embodiments, in the trained neural network, connection weights of at least one connection to be removed can be set to zero, and the trained neural network can be updated for an accuracy evaluation. If the accuracy of the updated neural network is satisfactory, the at least one connection can be finally removed from the neural network. On the other hand, if the accuracy of the updated neural network is not satisfactory, the threshold for removing connections can be adjusted. It is appreciated that the threshold can be adjusted according to different neural networks and different factors (e.g., accuracy, energy consumption, etc.) to which a neural network is applied.

Based on the remaining connections, neural network 201 can be updated into a final neural network (e.g., neural network 202 as shown in FIG. 2B). It is appreciated that the weights of the remaining connections can also be updated. As the original weights can be a number of bits (e.g., 32 bits), each of the updated weights can still include this number of bits.

Figure 2C:
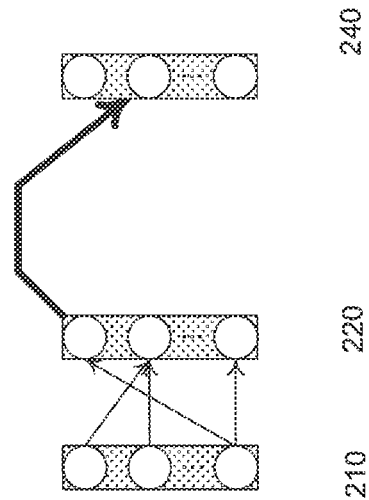
Figure 2B:
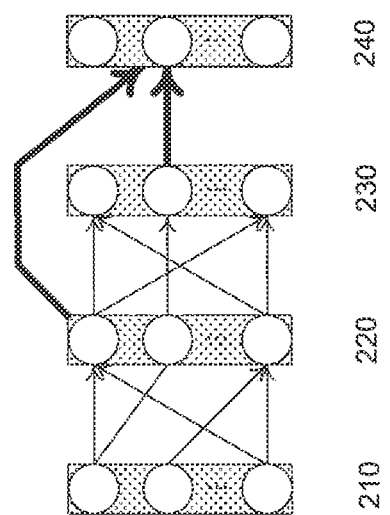

FIG. 2C illustrates a schematic diagram of a neural network 203 after the removal of a layer, according to embodiments of the disclosure. In some embodiments, a layer of a neural network can be removed during training to further simplify the neural network. For example, in FIG. 2C, layer 230 of FIG. 2A or 2B has been removed from the neural network.

In some embodiments, a layer weight for each layer of a neural network can be determined based on connections of the neural network. The layer weight of a layer can be related to connections weights of nodes of the layer. For example, the layer weight can be a sum of the connections weights of nodes of the layer. Then, it can be determined whether the layer weight of the layer satisfies a threshold. For example, when the layer weight is greater or equal to a threshold, the layer weight satisfies the threshold. Otherwise, when the layer weight is less than the threshold, the layer weight does not satisfy the threshold. If the layer weight of the connection does not satisfy the threshold, the layer (e.g., layer 230) can be removed. In some embodiments, a layer can be "removed" by setting connection weights of all connection related to the layer to zero. In some embodiments, the layer can also be removed by deleting the layer in the neural network.

Based on the remaining layers, neural network 201 can be updated into a final neural network (e.g., neural network 203 as shown in FIG. 2C). It is appreciated that connections and weights of the connections in the remaining layers can be updated.

Other than modifying the neural network based on training data, the training data can be modified before being used for training the neural network. In some embodiments, a portion of the training data can be removed. For example, the training data can include a plurality of dimensions (e.g., 10 dimensions). And before the training data is input for training the neural network, at least one dimension of the training data can be removed.

In some embodiments, time information can be involved with neural networks, such as a recurrent neural network (RNN) and a Long Short Term Memory network (LSTM), and the removed portion of the training data can be related to time domain. It is appreciated that these neural networks can process sequences of data. Therefore, a stimula of the neural network may not only come from a new input data from time T but also from historical information from time T−1. Therefore, before the training data is input to the neural network, first training data associated with time moment T1 can be removed out while second training data associated with time moment T2 can be provided to the neural network for training.

It is appreciated that connections among nodes and layers are related to training data. As discussed above, some connections or layers can be removed because the weights of the connections and layers are less than given thresholds. Thus, the connections or layers can be bypassed (or skipped) by input data when the neural network is used at run time. Also, a portion of training data may have weak influence on the result of the neural network, and thus can be neglected by the neural network. Accordingly, a filter can be generated based on the training of the neural network. In some embodiments, the filter can be generated by a learning algorithm. For example, the filter can be trained based on at least one of removed connections, removed layers, remaining connections and layer, and outputs of the neural network. In some embodiments, the filter can be a gate and/or a gating neural network between layers. For example, the filter can include a limited number of convolutional layer, an average pooling layer, and a fully connected layer to output a dimension vector. The filter can depend only on an output of a previous layer and apply a small number of convolution and pooling operations.

In some embodiments, the filter can be manually programmed to incorporate filtering rules. In some embodiments, the filter can also incorporate rules that are determined by, for example, a software engineer. In other words, the filter can be generated or designed by a software engineer.

In machining applications, the filter can be deployed at the host system of FIG. 1. Therefore, before the input data is transmitted to chip communication system 102, the filter can guide the input data to bypass at least one connection of the neural network at run time. For example, the filter can incorporate guiding information into the input data and the guiding information can include a route of the input data for passing through at least one connection of the machine learning model. It is appreciated that when all connections of a layer are bypassed, the layer is passed. For example, the filter can incorporate guiding information into the input data, so that certain connections or layers can be bypassed according to the guiding information. The filter can also reduce the input data by removing a portion of the input data. For example, when the input data passes through the filter, the portion (e.g., at least one dimension of the input data) can be removed from the input data. Therefore, in addition to lowering the processing burden of the neural network, data traffic between the host unit 120 and chip communication system 102 can be also lowered. Thus, the power consumption and bandwidth usage of architecture 100 can be reduced.

Figure 2D:
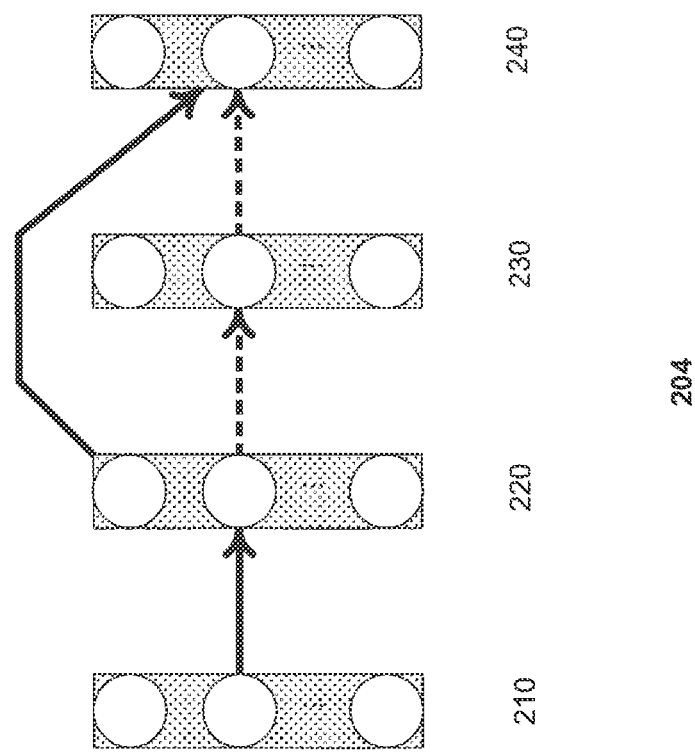
Figure 2E:
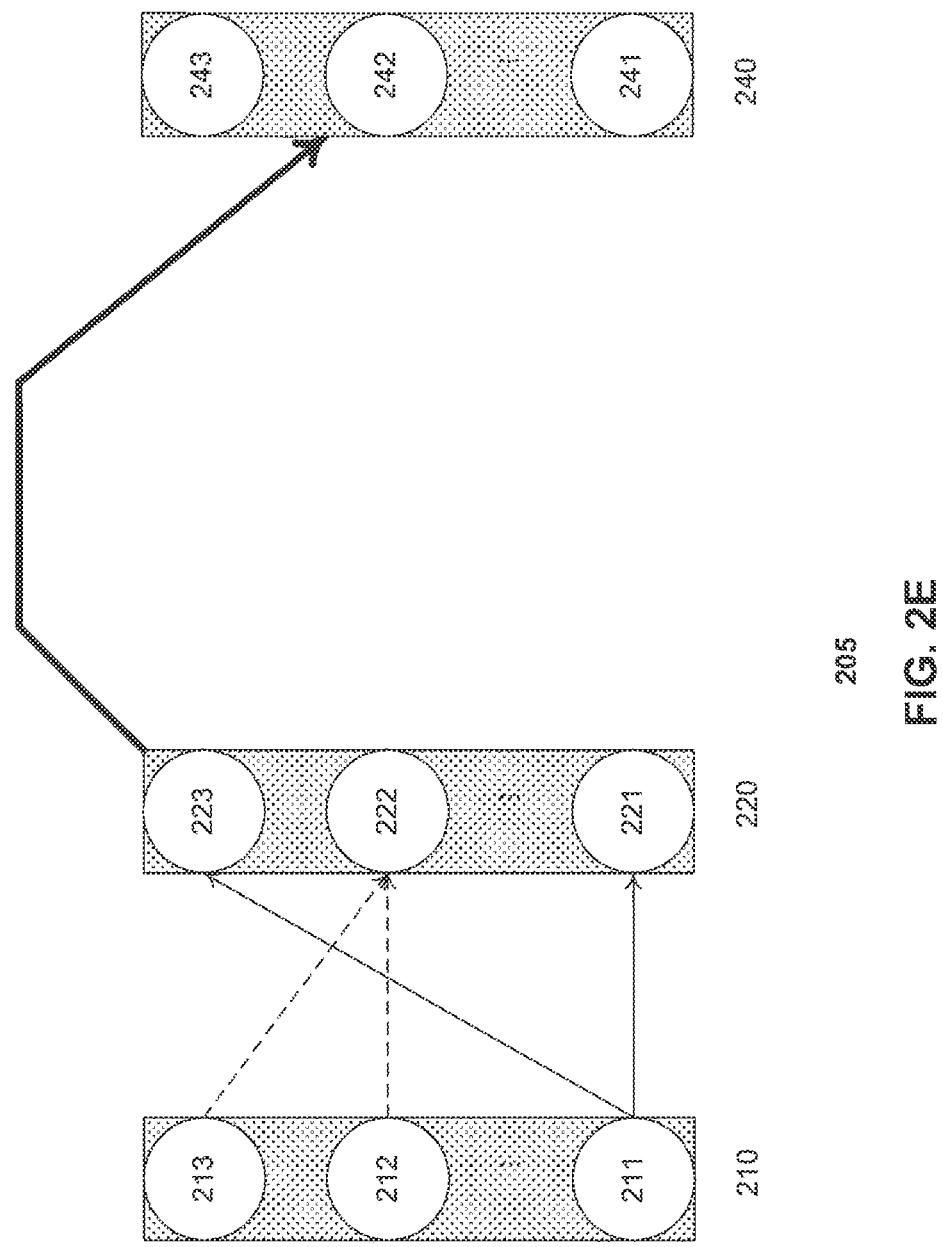
Figure 2F:
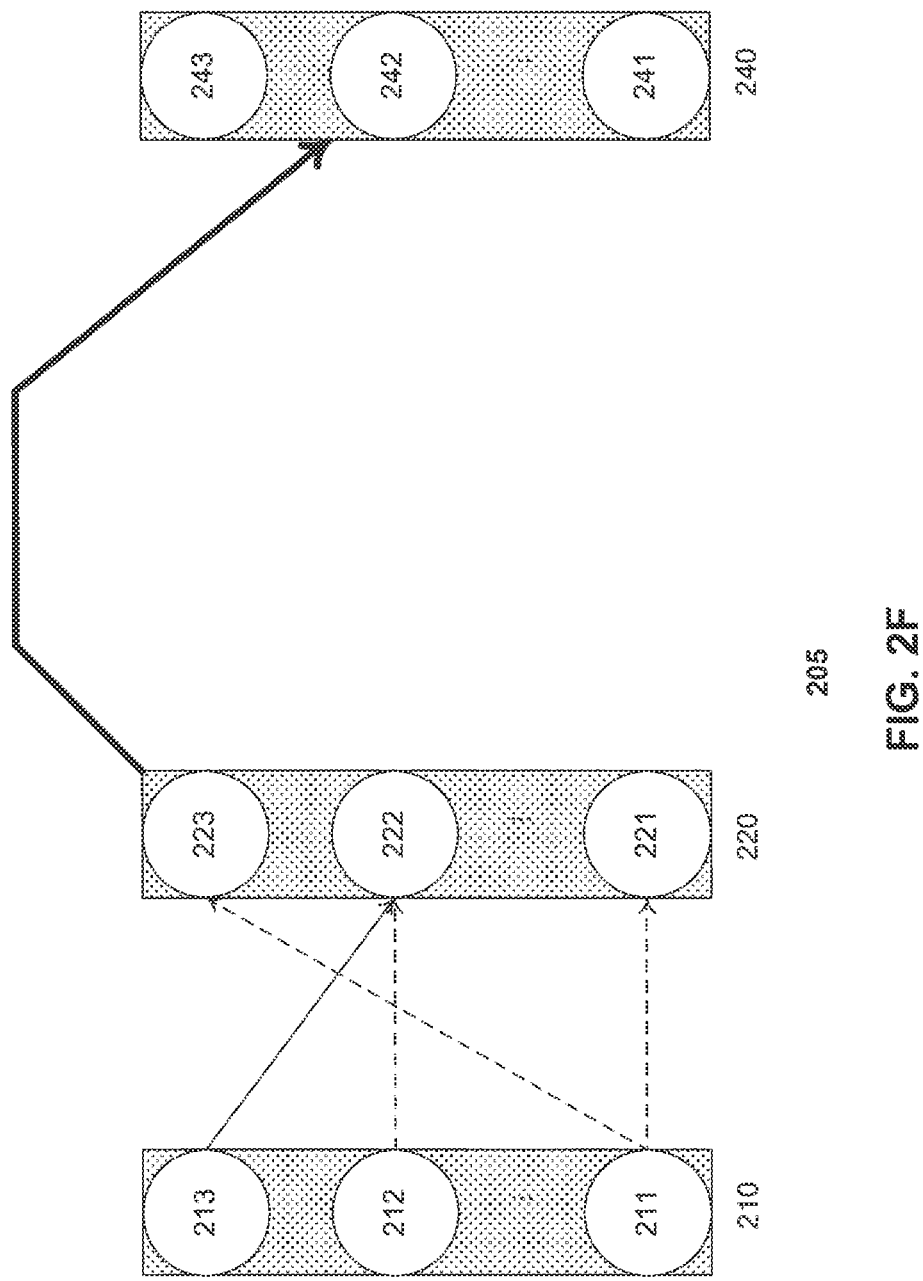

FIGS. 2D-2F illustrate examples of neural network 204-206 at run time, according to embodiments of the disclosure. In some embodiments, the simplification can also be performed on neural network 201 during inference. Simplification during inference can also be referred to as simplification at run time.

As discussed above, the input data can incorporate guiding information generated by a filter. In some embodiments of the disclosure, the guiding information can instruct the input data to bypass at least one layer. The guiding information can be generated by the filter based on at least one of the input data and the neural network. Therefore, the guiding information generated by the filter can be different depending on the input data and the neural network.

FIG. 2D illustrates a schematic diagram of neural network 204 at run time. As shown in FIG. 2D, some input data can bypass layer 230. In some embodiments, neural network 204 may generate an accurate result for some input data at run time without layer 230. For example, more complex input data may be routed through more layers, while less complex input data may be routed through less layers. And thus, based on the input data, layer 230 can be bypassed at run time. Therefore, the filter can generate the guiding information that instructs the input data to bypass layer 230.

It is appreciated that, in FIG. 2D, connections associated with layer 230 are still provided in neural network 204 and illustrated as dotted arrows. Therefore, it is possible that some other input data can pass through layer 230 via these connections.

Weights of the connections associated with layer 230 may be set to zero or any other values. Therefore, in embodiments of the disclosure, by bypassing at least one layer (e.g., setting weights of the connection of the layers to zero), the computation resources required for processing the input data can be reduced.

Other than bypassing at least one layer, embodiments of the disclosure can also bypass at least one connection between nodes at run time. FIG. 2E illustrates a schematic diagram of a neural network 205 at run time. As shown in FIG. 2E, between layers 210 and 220, neural network 205 includes a first connection between nodes 213 and 222, a second connection between nodes 212 and 222, and a third connection between nodes 211 and 223.

In some embodiments, neural network 205 may generate an accurate result for first input data at run time without at least one connection (e.g., the first and second connections as shown in FIG. 2E). And thus, for example, the first and second connections can be bypassed at run time, without deteriorating the result of neural network 205. Therefore, the filter can generate the guiding information that instructs the input data to bypass the first and second connections.

This way, the computation burden of running a neural network may be reduced without revising the neural network (e.g., permanently removing at least one connection from the neural network). Other than reducing the computation burden, this also allows more flexibility of running the neural network. As discussed above, the filter can be generated by a software engineer or based on training. Thus, it is possible to deploy different filters to a machine learning model in different application scenarios, respectively.

It is appreciated that the bypassed at least one connection at run time can be different according to different input data. For example, as shown in FIG. 2F, based on the guiding information, second and third connections of neural network 205 can be bypassed by second input data that is different from the first input data. As discussed above, the guiding information can include a route of the input data for passing through at least one connection of the machine learning model. In some embodiments, the routes for different input data can be different as shown in FIG. 2E and FIG. 2F.

Accordingly, in embodiments of the disclosure, by bypassing at least one connection, the computation resources required for processing the input data can also be reduced.

Figure 3:
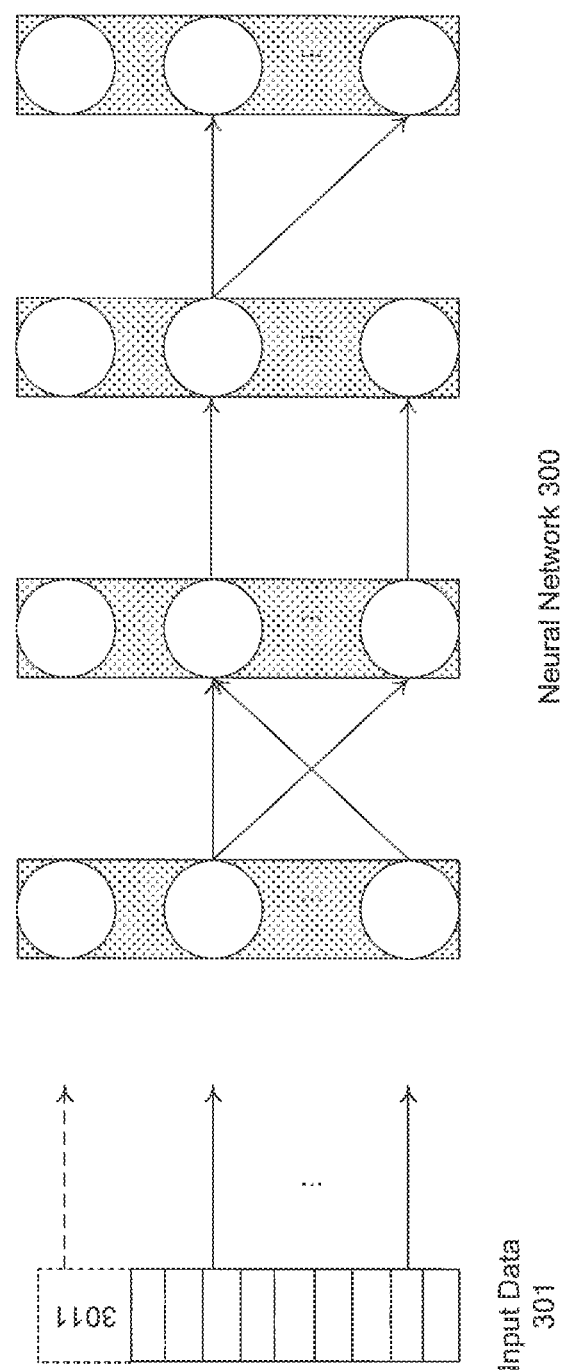
FIG. 3 illustrates a schematic diagram of simplification on input data, according to embodiments of the disclosure.

Other than simplification on training data at static time, simplification can also be performed on input data at run time. FIG. 3 illustrates a schematic diagram of simplification on input data, according to embodiments of the disclosure.

The simplification on input data can be performed by removing a portion of the input data before the input data is sent to the neural network.

In some embodiments, input data at run time may involve a plurality of dimensions. At least one of the dimensions can be removed from the input data. As shown in FIG. 3, input data 301 can include a plurality of dimensions (e.g., at least one dimension 3011). Before input data 301 is sent to a neural network 300 for processing, at least one dimension 3011 can be removed (e.g., by the filter) from input data 301. In some embodiments, the filter can determine the at least one dimension 3011 to be removed based on input data 301 and neural network 300.

In some embodiments, the removed portion of the input data can be related to time domain. For example, when the input data is related to time (e.g., a video), and the input data can include a sequence of data that is related to time moments. For example, data of a video can include a sequence of frames distributed across a period of time, and data of each frame corresponds to a time moment. In some embodiments, one portion of the input data (e.g., a frame of the video or a plurality of frames within a given period of time) can be bypassed by a neural network with very limited effects on the final result. For example, in the data of a video, the filter may determine that frames within the first five seconds can be removed from the input data, without affecting the final results significantly.

It is appreciated that the portion to be removed from the input data can be different, depending on the nature of the input data.

By removing a portion of the input data, the bandwidth occupied by the machine learning model can be reduced, and the computation resources and power consumption required by the machine learning model can also be reduced.

Figure 4:
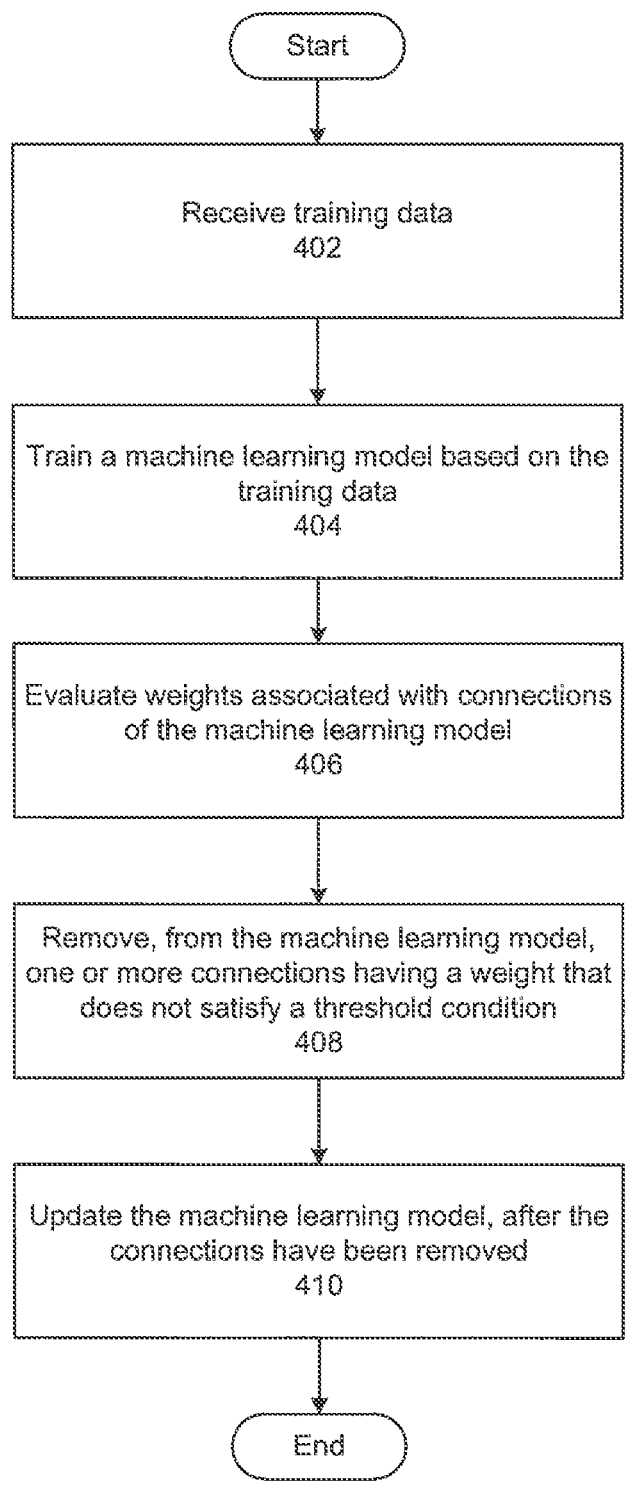
FIG. 4 illustrates a computer-implemented method, according to embodiments of the disclosure.

FIG. 4 illustrates a computer-implemented method 400, according to embodiments of the disclosure. Method 400 can be implemented by a computer system, such as neural network processing architecture 100 of FIG. 1. The computer system may include a memory storing a set of instructions and at least one processor configured to execute the set of instructions to cause the computer system to perform method 400. The at least one processor can include, for example, host unit 120 and chip communication system 102 of FIG. 1. The computer system may also include a communication interface (e.g., peripheral interface 112 of FIG. 1). Referring to FIG. 4, method 400 can include steps as below.

In step 402, the computer system can receive training data, e.g., via the communication interface. The training data can be stored in a database of the computer system or stored in another computer system. The training data can be reduced by removing a portion of the training data.

In some embodiments, when the training is supervised training, the training data can include a great number of labeled data. In some embodiments, the training data can include pairs of an input vector and a corresponding output vector. Therefore, the training data can include a plurality of dimensions. Each of the dimensions can be related to a character of the training data. In some embodiments, the removed portion can be associated with at least one dimension.

In some embodiments, the training data is related to time domain. For example, the training data can include first data associated with a first moment and second data associated with a second moment. And in removing a portion of the training data, the first data associated with the first moment can be removed.

In step 404, the computer system can train the machine learning model based on the training data. Before the machine learning model is trained, the parameters of the machine learning model have not been determined yet. The parameters can, for example, include connectivity of the machine learning model. As an example of the machine learning model, a neural network can include a plurality of layers, and each of the layers can include a plurality of nodes. And the plurality of nodes can be connected to generate connections among the nodes. Each connection can have a corresponding connection weight, and thus, the connections are weighted. By training, the connectivity of the machine learning model can be determined based on the training data. For example, the connections among the nodes can be established, weights can be determined and assigned to the connections.

Similarly, the computer system can also determine layers weights associated with layers of the machine learning model. In the machine learning model, each layer can have a corresponding layer weight. As discussed above, a layer weight for each layer of the machine learning model can be determined based on the connection weights.

In step 406, the computer system can evaluate weights associated with the connections of the machine learning model. For example, the computer system can determine whether the connection weight of the connection satisfies a threshold condition. In some embodiments, a connection may be removed from the machine learning model without significantly affecting the final result of the machine learning model. Such a connection can be determined as a removable connection. Correspondingly, a connection may be determined as a non-removable connection if removal of the connection can generate an inaccurate result of the machine learning model. The threshold condition can be associated with a connection weight threshold for identifying the removable connection and the non-removable connection. For example, when the connection weight of a connection is greater than or equal to the connection weight threshold, the connection fails to satisfy the threshold condition and is evaluated as a non-removable connection. Also for example, when the connection weight of a connection is less than the connection weight threshold, the connection satisfies the threshold condition and is evaluated as a removable connection.

Similarly, in some embodiments, a whole layer can be removed from the machine learning model without significantly affecting the final result of the machine learning model. Such a layer can be determined as a removable layer. Correspondingly, a layer may be determined as a non-removable layer if removal of the layer can generate an inaccurate result of the machine learning model. Thus, a layer threshold condition can be associated with a layer weight threshold for identifying the removable layer and the non-removable layer, and the computer system can further determine whether the layer weight of a layer satisfies the layer threshold condition. For example, when the layer weight of a layer is greater than or equal to the layer weight threshold, the layer fails to satisfy the layer threshold condition and is determined as a non-removable layer. Also for example, when the layer weight of a layer is less than the layer weight threshold, the connection satisfies the layer threshold condition and is determined as a removable layer.

In step 408, the computer system can remove, from the machine learning model, one or more connections having a weight that does not satisfy the threshold condition. In other words, the determined removable connection can be removed from the machine learning model.

Similarly, the removable layer can also be removed from the machine learning model.

In step 410, the computer system can update the machine learning model, after the connections have been removed. It is appreciated that, after the removable connections are finally removed from the machine learning model, the computer system can establish new connections among nodes, where the original connections have been removed.

By removing at least one connection or layer from the machine learning model, the complexity of the machine learning model can be reduced. Accordingly, the storage space for the machine learning model and the power consumption for running the machine learning model can also be reduced.

In addition, the computer system can further generate a filter for evaluating input data to be provided to the machine learning model. The filter can be used for performing machine learning, which will be further described with reference to FIG. 5 as below.

Figure 5:
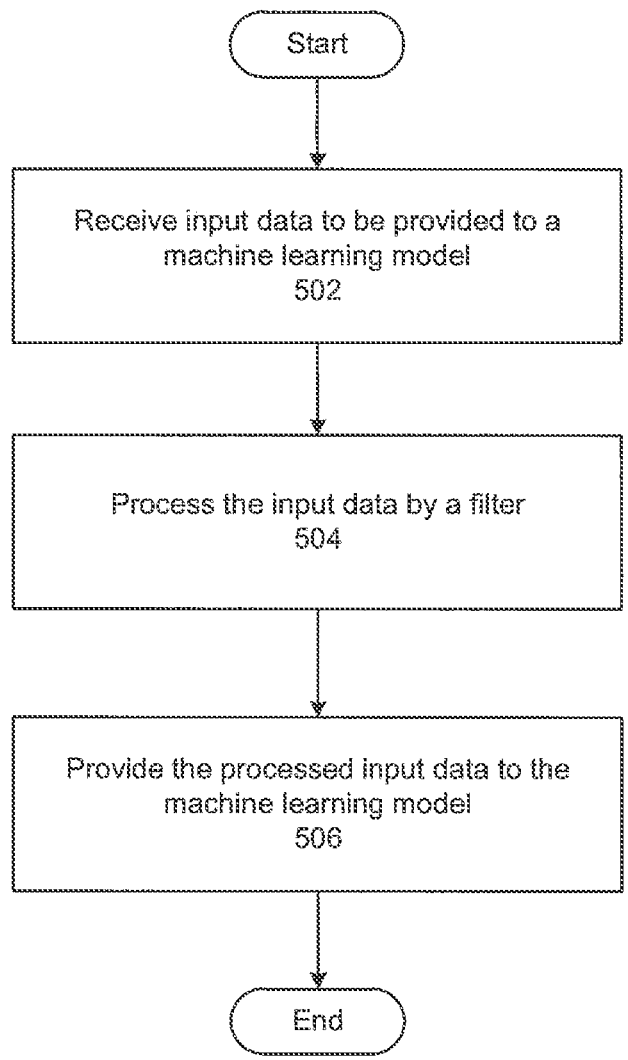
FIG. 5 illustrates a computer-implemented method for performing machine learning, according to embodiments of the disclosure.

FIG. 5 illustrates a computer-implemented method 500 for performing machine learning, according to embodiments of the disclosure. Method 500 can be implemented by a computer system, such as neural network processing architecture 100 of FIG. 1. The computer system may include a memory storing a set of instructions and at least one processor configured to execute the set of instructions to cause the computer system to perform method 500. The at least one processor can include, for example, host unit 120 and chip communication system 102 of FIG. 1. The computer system may also include a communication interface (e.g., peripheral interface 112 of FIG. 1). Referring to FIG. 5, method 500 can include steps as below.

In step 502, the computer system can receive input data to be provided to a machine learning mode. The machine learning model can include multiple layers each having one or more nodes having one or more connections with a node from another layer of the machine learning model. The machine learning model can be used in a machine learning application. The machine learning application can be executed in neural network processing architecture 100. The machine learning application can be divided into a plurality of tasks, and one of the tasks can be executed on host unit 120 while another one can be determined as a machine learning task and executed by the machine learning model on chip communication system 102. The input data can be related to the machine learning task and can be provided to the machine learning model for processing.

In step 504, the computer system can process the input data by a filter. After the input data is received, the filter can be called for processing the input data. The filter can be a part of the machine learning application that can be executed by the computer system, or a function provided by the computer system. As discussed with reference to FIGS. 1-3, the filter can be generated based on training of the machine learning model or designed by a software engineer.

Based on the input data, features of the input data can be extracted and compared with the machine learning model. In some embodiments, the guiding information for the input data can be generated by the filter. The guiding information can be incorporated into the input data, so that the processed input data can be configured to bypass at least one connection based on the guiding information. For example, to bypass a connection, a weight of the connection can be set to zero for the given input data. It is appreciated that for another input data, the weight of the connection may not be changed. In some embodiments, a connection may include a default weight and a bypass weight. The default weight is determined based on training, and the bypass weight is zero. Based on the guiding information, the computer system can determine whether a weight of the connection is the default weight or the bypass weight. It is appreciated that the bypass weight can be another value.

In some embodiments, the guiding information can instruct the input data to bypass connections associated with a layer, so that the layer can be bypassed by the input data. It is appreciated that, when a layer is bypassed, the at least one connection can include all connections associated with the layer.

In some embodiments, by using the filter, the computer system can remove a portion of the input data, and update the input data accordingly. For example, based on the features of the input data, the computer system can determine that a portion of the input data can be removed without deteriorating the result of running the machine learning model and remove the portion of the input data. The input data can be updated and provided to the machine learning model. In some embodiments, the input data can include a plurality of dimensions, and the removed portion is associated with at least one dimension. In some embodiments, the input data can be related to time domain. For example, the input data can include first data associated with a first moment and second data associated with a second moment. And in removing a portion of the input data, the first data associated with the first moment can be removed.

In step 506, the computer system can provide the processed input data to the machine learning model. The machine learning model can generate a result of the machine learning. For example, as an inference engine, chip communication system 102 (involving one or more accelerators) can generate the result using the machine learning model and send back the result to host unit 120.

It is appreciated that the filter can be applied for a unsimplified machine learning model. Though the unsimplified machine learning model include full connections, one or more connections can be bypassed by input data using the filter at run time. Because one or more connections are bypassed by the input data at run time, the computation resources and power consumption for running the machine learning model can be reduced, though the machine learning model is not simplified. Removing a portion of the input data can further reduce communication load between the host unit 120 and chip communication system 102, in addition to reducing the computation resources and power consumption.

Embodiments of the disclosure also provide a computer program product. The computer program product may include a non-transitory computer readable storage medium having computer readable program instructions thereon for causing a processor to carry out the above-described methods.

The computer readable storage medium may be a tangible device that can store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object oriented programming language, and conventional procedural programming languages. The computer readable program instructions may execute entirely on a computer system as a stand-alone software package, or partly on a first computer and partly on a second computer remote from the first computer. In the latter scenario, the second, remote computer may be connected to the first computer through any type of network, including a local area network (LAN) or a wide area network (WAN).

The computer readable program instructions may be provided to a processor of a general-purpose or special-purpose computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not to be considered essential features of those embodiments, unless the embodiment is inoperative without those elements.

What is claimed is:

1. A computer-implemented method comprising:
   receiving training data;
   training a machine learning model based on the training data, wherein the machine learning model includes multiple layers each having one or more nodes having one or more connections with a node from another layer of the machine learning model;
   evaluating weights associated with the connections of the machine learning model, wherein each connection has a corresponding weight;
   removing, from the machine learning model, one or more connections having a weight that does not satisfy a threshold condition;
   evaluating layer weights associated with the layers of the machine learning model, wherein each layer has a corresponding layer weight;
   removing, from the machine learning model, one or more layers having a layer weight that does not satisfy a layer threshold condition; and after the connections and the one or more layers have been removed, updating the machine learning model.

2. The method according to claim 1, wherein receiving the training data further comprises:
reducing the training data by removing a portion of the training data.

3. The method according to claim 2, wherein the training data includes a plurality of dimensions, and the removed portion is associated with at least one dimension.

4. The method according to claim 2, wherein the training data includes first data associated with a first moment and second data associated with a second moment, and reducing the training data by removing the portion of the training data further comprises:
removing the first data associated with the first moment from the training data.

5. The method according to claim 1, further comprising:
generating a filter for evaluating input data to be provided to the machine learning model.

6. A non-transitory computer readable medium that stores a set of instructions that is executable by at least one processor of a computer system to cause the computer system to perform a method for simplifying a machine learning model, the method comprising:
receiving training data;
training a machine learning model based on the training data, wherein the machine learning model includes multiple layers each having one or more nodes having one or more connections with a node from another layer of the machine learning model;
evaluating weights associated with the connections of the machine learning model, wherein each connection has a corresponding weight;
removing, from the machine learning model, one or more connections having a weight that does not satisfy a threshold condition;
evaluating layer weights associated with the layers of the machine learning model, wherein each layer has a corresponding layer weight;
removing, from the machine learning model, one or more layers having a layer weight that does not satisfy a layer threshold condition; and
after the connections and the one or more layers have been removed, updating the machine learning model.

7. The non-transitory computer readable medium according to claim 6, wherein receiving the training data further comprises:
reducing the training data by removing a portion of the training data.

8. The non-transitory computer readable medium according to claim 6, wherein the training data includes a plurality of dimensions, and the removed portion is associated with at least one dimension.

9. The non-transitory computer readable medium according to claim 7, wherein the training data includes first data associated with a first moment and second data associated with a second moment, and reducing the training data by removing the portion of the training data further comprises:
removing the first data associated with the first moment from the training data.

10. The non-transitory computer readable medium according to claim 6, wherein the set of instructions is further executed by the at least one processor of the computer system to cause the computer system to perform:
generating a filter for evaluating input data to be provided to the machine learning model.

11. A computer system, comprising:
a memory storing a set of instructions; and
at least one processor configured to execute the set of instructions to cause the system to perform:
receiving training data;
training a machine learning model based on the training data, wherein the machine learning model includes multiple layers each having one or more nodes having one or more connections with a node from another layer of the machine learning model;
evaluating weights associated with the connections of the machine learning model, wherein each connection has a corresponding weight;
removing, from the machine learning model, one or more connections having a weight that does not satisfy a threshold condition;
evaluating layer weights associated with the layers of the machine learning model, wherein each layer has a corresponding layer weight;
removing, from the machine learning model, one or more layers having a layer weight that does not satisfy a layer threshold condition; and
after the connections and the one or more layers have been removed, updating the machine learning model.

12. The method according to claim 5, further comprising:
processing the input data to comprise guiding information using the filter, and the processed input data is configured to bypass at least one connection of the machine learning model based on the guiding information.

* * * * *